Figure 1:
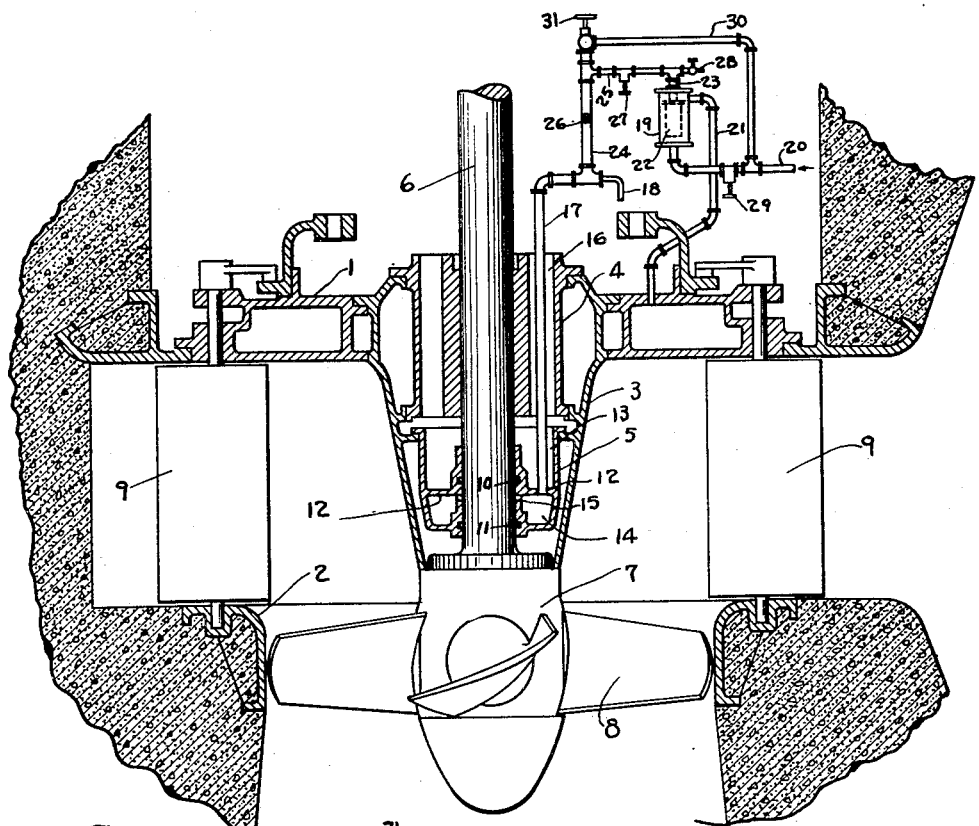

Nov. 7, 1933.    J. P. POWELL    1,934,628
LIQUID SEAL FOR ROTARY APPARATUS
Filed Aug. 25, 1930

Patented Nov. 7, 1933

1,934,628

UNITED STATES PATENT OFFICE 1,934,628

LIQUID SEAL FOR ROTARY APPARATUS

John P. Powell, Detroit, Mich., assignor to Allis-Chalmers Manufacturing Company, Milwaukee, Wis., a corporation of Delaware Application August 25, 1930. Serial No. 477,578

12 Claims. (Cl. 286—9)

This invention relates in general to shaft packing and relates more specifically to improvements in liquid seal shaft packings for rotary engines, such as turbines, for the purpose of preventing the working fluid from leaking along the shaft and mixing with the lubricant and also preventing the loss of the lubricant by leakage along the shaft.

An object of the invention is to provide a constant level automatically maintained liquid seal for interrupting a shaft surrounding leakage space at a point intermediate an atmospheric oil chamber and a variable pressure area forming the terminals of said leakage space. Another object of the invention is to provide a hydraulic turbine with means for automatically maintaining a constant level of water in a water seal chamber in communication with an oil chamber through an unavoidable shaft surrounding leakage space, and thereby prevent the escape of oil from the oil chamber into the water seal chamber when the rotor end of the turbine shaft is subjected to suction or atmospheric pressure. Another object of the invention is to prevent the escape of the hydraulic working fluid along the turbine shaft and mixing of said fluid with the oil in the oil chamber, when above atmospheric pressures exist adjacent the rotor end of the turbine shaft.

Another object of the invention is to provide a hydraulic turbine with a constant level automatically maintained liquid shaft sealing or packing means that is easily installed, inexpensive and efficient in operation.

Other objects and advantages of this invention will be apparent from a reading of the specification and of the drawing forming a part thereof, on which like reference numerals are used to designate the same elements throughout the various views.

On the drawing Fig. 1 is a vertical central section through a hydraulic turbine having the novel water sealing means applied therein, which is more or less diagrammatically shown in the figure.

Figure 2:
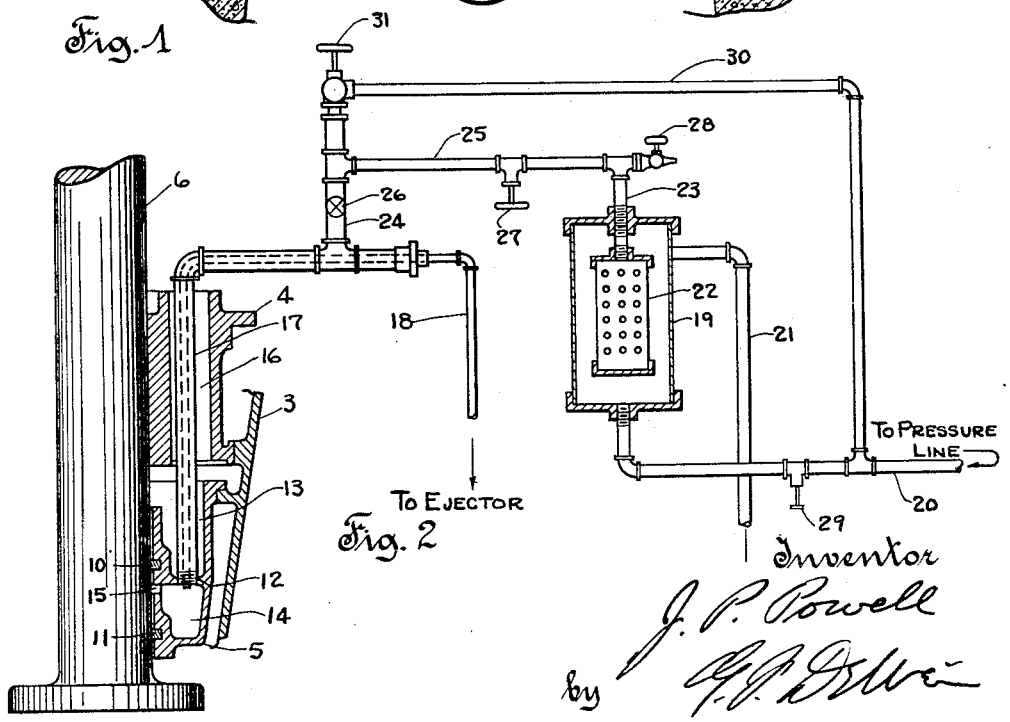

Fig. 2 is an enlarged fragmentary view of the bearing portion of the turbine shown in Fig. 1 showing the turbine shaft and the improved packing or sealing controlling means in working position and in greater detail.

Referring to Fig. 1 reference numeral 1 represents the cover plate which with bottom member 2 form a guide casing for the hydraulic turbine. This casing has the usual adjustable guide vanes 9 mounted within it to control and guide the flow of water into the turbine. Mounted in a central aperture in the cover plate 1 is a cover plate extension 3. It is customary to provide a clearance space between the end of extension 3 and the adjacent hub portion of runner 7 provided with adjustable vanes 8. The runner 7 is fixed to the annular flange of a main shaft 6 which is received for rotation in bearing elements carried by the cover plate extension 3. Adjacent the flange end of the shaft 6 and suspended within extension 3 by means of an annular flange which engages a ledge on the interior of extension 3 is a water seal casing 5. This casing 5 conforms generally to the outline of the surrounding portion of extension 3, and has two shaft engaging bearing portions defined by a partition 12 which divides casing 5 into two chambers, an upper oil chamber 13 and a lower water seal chamber 14. Lignum vitae blocks, 10 and 11, each comprising a plurality of segments, spring-pressed to snugly surround shaft 6 are received in grooves in said bearing portions. In spite of this provision of packing means, a leakage space is found to exist along the shaft 6 past packing blocks 10 and 11, which phenomena will again be taken up in its relation to the present invention. Positioned above the casing 5 is another bearing element, bearing housing 4, having opposite ends provided with flanges cooperating with flanges on cover plate extension 3, for suspending from and properly positioning housing 4 in extension 3. Housing 4 is generally cylindrical in form and provided with a shaft receiving bore or bearing and a plurality of overflow openings 16. Through openings 16 may be passed any form of means for delivering oil from oil chamber 13 to a place above housing 4 where it is released to flow down over the bearings and into oil chamber 13. An annular slot 15 is formed in lower bearing portion of water seal casing 5 to extend the water surface in the water chamber 14 to the shaft 15 for purposes which will presently be explained.

The novel means for maintaining a constant level of water in the water chamber 14, for the purposes already set forth will now be explained. A water pipe 17 the vertical portion of which is shown extended through one of the openings 16 in bearing housing 4, passes with a tight fit through an opening in partition 12 to effect a communication with water chamber 14. Within pipe 17 is located an ejector pipe 18 which has one end connected to an ejector device, such as Venturi tube, and has its other end extending into water chamber 14. The latter end of the ejector pipe should be at a slightly higher elevation than the lower edge of the annular slot 15 for reasons which will later appear and slightly lower than the lower end of water pipe 17, a space of ¼" having been found satisfactory.

A constant head water container 19 is fixed in spaced relation to the water chamber 14 and has a pressure line 20 connected to its bottom. An overflow pipe 21 is connected to the side wall of container 19 near the top thereof and serves to maintain a constant head of water in container 19 with water continuously entering through pressure line 20. A strainer 22 is connected to a pipe 23 at a point below the level of the water in container 19. Pipe 23 is connected by means of horizontal pipe 25 with vertical pipe 24 of water pipe 17 adjacent the latter's closed end. The pressure of the water in container 19 and the flow into water pipe 17 is controlled by valves 29 and 27 in pressure line 20 and pipe 25, respectively.

The operation of the novel sealing means is as follows: When a hydraulic machine, such as disclosed, is operating under low load, that is with the guide vanes partially closed, the water entering the turbine will form a vortex around the inner periphery of the guide vanes and a suction space will be found to exist around the cover plate extension 3 and suction will therefore exist in the clearance space of extension 3 and all the way along the shaft 6 past the lignum vitae blocks 11 and 10 and reaching to the upper portion of the oil chamber 13. This suction would tend to draw the oil from oil chamber 13 to escape along the shaft 6 past lignum vitae blocks 10 and 11 and into the draft tube where it would be lost for lubrication purposes. But this does not occur because of the action of the novel sealing means. For should the level of the water in the water seal chamber be below the lower edge of annular slot 15 the suction present along the shaft would exist in the water chamber because it would be in open communication with the shaft surrounding leakage space. This suction would tend to overcome the head on the pipe 23, due to its spacing by the horizontal pipe 25 from the constant level of the water in container 19, and a flow of water would occur from container 19, through pipes 23, 25, 24 and 17, into water seal chamber 14 as the suction overcomes the effect of said head on pipe 23. The level of the water in water chamber 14 will then rise above the lower edge of annular slot 15 to approximately the elevation of the lower end of ejector pipe 18 whence the flow into the water chamber 14 from water container 19 will have stopped but in the meantime the surface of the water in water chamber 14 has been extended to engage shaft 6 and therefore, the water seal cuts off the suction at this point and no oil will be sucked from oil chamber 13. In this manner a loss of oil is prevented under the assumed condition of sub-atmospheric pressure adjacent the cover plate extension clearance, due to a low load on the turbine.

On the other hand when the turbine is operating under full load, that is with the guide vanes wide open, or extending more radially with respect to the turbine axis, a pressure area will exist adjacent the cover plate extension 3 and therefore in its clearance space and along the leakage space of shaft 6, past lignum vitae blocks 10 and 11. The leakage water by reason of this pressure would tend to flow up along said leakage space, and the first leakage water would enter the water chamber 14 through the annular slot 15 until the chamber became filled and following leakage water would then tend to pass into oil chamber 13. But this likewise does not occur because of the action of the novel sealing means. For should the level of the water in the water chamber 14 rise above the level of the ejector pipe 18 by reason of said pressure forcing leakage water into said chamber, ejector pipe 18 would immediately begin to withdraw water from water chamber 14, to maintain the normal level therein by causing further leakage water to enter the water chamber and to be carried away by ejector pipe 18 and not to be allowed to move along the shaft 6 into the oil chamber 13. In this manner a contamination of the oil for lubricating purposes with water is prevented under the assumed conditions of above atmospheric pressure adjacent the cover plate extension clearance, due to a full load on the turbine.

If it is desired to clean the strainer 22, valve 29 in pressure line 20 is closed, valve 31 in branch pressure line 30 opened, valve 26 in water pipe 24 closed and the valve 27 remains open as is the case when the arrangement is normally operating as a constant level automatically maintained liquid sealing means.

Any suitable liquid may be used as the sealing liquid but water because of its comparative cheapness would obviously be used in most cases.

By manipulating petcock 28 in pipe 25, and simultaneously observing the position of guide vanes 9 and the flow from overflow pipe 21 the operative status of the disclosed liquid sealing means may be determined.

It should be understood that it is not desired to limit the invention to the exact details of construction and of operation herein shown and described, for various modifications within the scope of the claims may occur to persons skilled in the art.

It is claimed and desired to secure by Letters Patent:

1. A sealing device for shafts of rotary engines comprising an annular casing adapted to closely receive a vertical shaft and retain a column of liquid axially of the shaft, and means responsive to under and over pressures at one axial side of said casing for maintaining a constant level of sealing liquid in said casing to interrupt a shaft surrounding leakage space within the limits of said casing.

2. A liquid seal for rotary machines comprising a chambered casing adapted to closely receive a vertical shaft and retain a column of liquid axially of the shaft, and means comprising a source of liquid supply and an ejector pipe communicating with said casing and responsive to the under and over pressures at one axial side of said casing for maintaining a constant level of sealing liquid in said casing, to interrupt a shaft surrounding leakage space within the limits of said casing.

3. A liquid sealing device for vertical shafts of rotary engines comprising an annular casing adapted to closely receive a shaft, and having a liquid seal chamber in communication with a shaft surrounding leakage space, and under and over pressure responsive means for automatically maintaining a constant level of liquid in said seal chamber so that the surface of said liquid will remain extended to said shaft surface to interrupt the shaft surrounding leakage space.

4. In combination, a vertical shaft, a casing surrounding said shaft, and forming bearings for said shaft and providing liquid receiving chambers, one of said chambers being subjected to atmospheric pressure and the exterior of said casing being subjected to under and over pressures, said other chamber containing a sealing liquid, and means for automatically maintaining a constant level of liquid in said latter chamber.

5. A liquid sealing device for vertical shafts of rotary engines comprising an annular casing providing a plurality of shaft surrounding liquid chambers, and adapted to closely receive a shaft, said chambers being in communication with a leakage space formed between the shaft and said casing, one of said chambers carrying a lubricant and the other of said chambers carrying a sealing liquid, and means responsive to the under and over pressures in the engine for automatically maintaining a constant level of liquid in said seal chamber so that the surface of its liquid remains extended to said shaft surface to interrupt the shaft surrounding leakage space.

6. A liquid sealing device for vertical shafts of rotary engines comprising an annular casing providing a plurality of shaft surrounding liquid chambers, and adapted to closely receive a shaft, said chambers being in communication with a leakage space formed between the shaft and said casing, one of said chambers carrying a lubricant at atmospheric pressure and the other of said chambers carrying a sealing liquid and being subjected to under and over engine pressures, through said leakage space, and means responsive to said pressures in said seal chamber for automatically maintaining a constant level of liquid in said seal chamber and extending to said shaft surface to prevent the escape of lubricant from said lubricating chamber along said leakage space.

7. A hydraulic sealing device for vertical shafts of hydraulic turbines comprising an annular casing providing a plurality of shaft surrounding liquid chambers, and adapted to closely receive a shaft, said chambers being in communication with a leakage space formed between the shaft and said casing, one of said chambers carrying a lubricant at atmospheric pressure and the other of said chambers carrying a hydraulic liquid and being subjected to the under and over pressures adjacent said shaft caused by the hydraulic working fluid when the turbine is operating under variable loads, through said leakage space, and means responsive to said pressures in said seal chamber for automatically maintaining a constant level of liquid in said seal chamber and extending to said shaft surface, to prevent the escape of lubricant from said lubricating chamber and the escape of hydraulic working fluid along said leakage space into said lubricating chamber because of said pressures.

8. The combination with a hydraulic turbine casing and a rotor shaft extending vertically therethrough, of a packing means for sealing said shaft against fluid leakage, comprising a water seal casing carried by said turbine casing and positioned within the confines of the turbine guide vanes, said water seal casing closely receiving the rotor shaft and providing a water seal chamber and a lubricating oil chamber each being in communication with a leakage space formed between said rotor shaft and the surrounding portions of said seal casing, and means responsive to the under and over pressures in said water seal chamber caused by the hydraulic working fluid when said turbine is operated under variable loads, for maintaining a constant level of water in said water seal chamber, extending to the surface of said shaft, to prevent the escape of oil from said lubricating oil chamber and the escape of hydraulic working fluid along said leakage space into said oil chamber because of said pressures.

9. In a hydraulic turbine, in combination, a vertical shaft, a casing through which the shaft projects, packing members interposed between the shaft and casing, said casing providing a water seal chamber and an atmospheric lubricating oil receiving chamber, each communicating with the turbine working space through a leakage space along said shaft past said packing members, and means responsive to the under and over pressures created by the hydraulic working fluid when the turbine is operating under variable loads for maintaining a constant level of water in said seal chamber and extending to the shaft surface to prevent the escape of hydraulic fluid past said members into said oil chamber and the escape of oil from said oil chamber along said shaft.

10. In combination, a substantially vertical shaft, means surrounding and engaging said shaft, said means forming an atmospheric oil chamber, and a shaft surrounding constant level automatically maintained liquid seal responsive to the under and over pressures existing exteriorly of said chamber, said seal interrupting a shaft surrounding leakage space, one portion of which provides continuous communication between said chamber and said seal, the other portion of said leakage space being subject to said over and under pressures.

11. In combination, a substantially vertical shaft, means forming an oil chamber adjacent said shaft, said chamber being subjected to atmospheric pressure, the exterior of said chamber being subjected to under and over pressures and a shaft surrounding constant level automatically maintained liquid seal responsive to said pressures, the exterior of said chamber coinciding with a portion of a shaft surrounding leakage space providing continuous communication between said oil chamber and said seal, the other portion of said shaft surrounding leakage space being subject to said under and over pressures for preventing the liquid of said seal from escaping along said shaft into said oil chamber and the escape of oil from said chamber along said shaft.

12. In a rotary engine employing a liquid working fluid, a vertical shaft, means forming an oil chamber adjacent said shaft, said chamber being subjected to moderate pressure, means forming a liquid seal chamber adjacent said oil chamber, said seal chamber forming means surrounding and engaging said shaft, said seal chamber being subjected to the under and over pressures due to the working fluid when the engine is operating under different loads, through a slot in said seal chamber forming means, and means responsive to said pressures for maintaining a constant level of liquid in said seal chamber to interrupt a shaft surrounding leakage space and thereby prevent the escape of working fluid into said oil chamber and the escape of oil from said oil chamber.

JOHN P. POWELL.

CERTIFICATE OF CORRECTION.

Patent No. 1,934,628.                                                            November 7, 1933.

JOHN P. POWELL.

It is hereby certified that error appears in the printed specifications of the above numbered patent requiring correction as follows: Page 2, line 120, claim 1, strike out the word "vertical" and insert the same before "shafts" in line 118, of same claim; and that the said Letters Patent should be read with this correction therein that the same may conform to the record of the case in the Patent Office.

Signed and sealed this 12th day of December, A. D. 1933.

(Seal)                                                          F. M. Hopkins
                                                                   Acting Commissioner of Patents.